(12) United States Patent
Yamada et al.

(10) Patent No.: US 11,994,323 B2
(45) Date of Patent: May 28, 2024

(54) REFRIGERANT CHARGING METHOD, HEAT SOURCE UNIT, AND RENEWED REFRIGERATION CYCLE APPARATUS

(71) Applicant: DAIKIN INDUSTRIES, LTD., Osaka (JP)

(72) Inventors: Takuro Yamada, Osaka (JP); Atsushi Yoshimi, Osaka (JP); Eiji Kumakura, Osaka (JP); Ikuhiro Iwata, Osaka (JP); Shun Ohkubo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 478 days.

(21) Appl. No.: 17/280,406

(22) PCT Filed: Sep. 20, 2019

(86) PCT No.: PCT/JP2019/037050
§ 371 (c)(1),
(2) Date: Mar. 26, 2021

(87) PCT Pub. No.: WO2020/066923
PCT Pub. Date: Apr. 2, 2020

(65) Prior Publication Data
US 2022/0003469 A1    Jan. 6, 2022

(30) Foreign Application Priority Data

Sep. 28, 2018 (JP) .................................. 2018-184329
Sep. 28, 2018 (JP) .................................. 2018-184330
(Continued)

(51) Int. Cl.
*F25B 45/00*    (2006.01)
*F25B 13/00*    (2006.01)
(Continued)

(52) U.S. Cl.
CPC .............. *F25B 45/00* (2013.01); *F25B 13/00* (2013.01); *F25B 49/02* (2013.01); *F25B 40/00* (2013.01);
(Continued)

(58) Field of Classification Search
CPC .......... F25B 45/00; F25B 13/00; F25B 49/02; F25B 41/24; F25B 40/00; F25B 43/003;
(Continued)

(56) References Cited

U.S. PATENT DOCUMENTS 4,441,330 A    4/1984 Lower et al.
5,927,087 A    7/1999 Ishikawa
(Continued)

FOREIGN PATENT DOCUMENTS

CN    101691963 A    4/2010
CN    102032732 A    4/2011
(Continued)

OTHER PUBLICATIONS

International Search Report, issued in PCT/JP2019/037050, PCT/ISA/210, dated Oct. 29, 2019.
(Continued)

*Primary Examiner* — Davis D Hwu
(74) *Attorney, Agent, or Firm* — Birch, Stewart, Kolasch & Birch, LLP

(57) ABSTRACT

There is provided a refrigerant charging method in which a foreign material and moisture are avoided from entering a heat source unit until a refrigeration cycle apparatus is configured. The refrigerant charging method is a method of charging a refrigerant to a refrigerant circuit in which a refrigeration cycle is to be performed by a circulating refrigerant, the refrigerant circuit being configured by connecting a second heat source unit and a utilization unit to each other. The refrigerant charging method includes charg-
(Continued)

ing a first refrigerant to the second heat source unit before connecting the second heat source unit to the utilization unit to configure the refrigerant circuit, and connecting the second heat source unit to the utilization unit and charging a second refrigerant that differs from the first refrigerant to the refrigerant circuit to obtain the circulating refrigerant that includes the second refrigerant and the first refrigerant that is charged in the second heat source unit.

16 Claims, 9 Drawing Sheets

(30) Foreign Application Priority Data

Sep. 28, 2018 (JP) ................................ 2018-184331
Sep. 28, 2018 (JP) ................................ 2018-184332

(51) Int. Cl.
  *F25B 49/02* (2006.01)
  *F25B 40/00* (2006.01)
  *F25B 41/24* (2021.01)
  *F25B 43/00* (2006.01)

(52) U.S. Cl.
  CPC ............. *F25B 41/24* (2021.01); *F25B 43/003* (2013.01); *F25B 2313/0233* (2013.01); *F25B 2345/001* (2013.01); *F25B 2345/003* (2013.01); *F25B 2345/007* (2013.01); *F25B 2400/12* (2013.01); *F25B 2400/19* (2013.01); *F25B 2500/221* (2013.01); *F25B 2600/2513* (2013.01)

(58) Field of Classification Search
  CPC ........ F25B 2313/0233; F25B 2345/001; F25B 2345/003; F25B 2345/007; F25B 2400/12; F25B 2400/19; F25B 2500/221; F25B 2600/2513
  USPC ............................................................. 62/77
  See application file for complete search history.

(56) References Cited

U.S. PATENT DOCUMENTS

| | | | |
|---|---|---|---|
| 6,035,648 A | 3/2000 | Hickman et al. | |
| 6,196,008 B1 | 3/2001 | Fujitaka et al. | |
| 6,425,252 B1 | 7/2002 | Kobayashi et al. | |
| 9,759,464 B2 | 9/2017 | Sanhaji | |
| 2003/0213256 A1 | 11/2003 | Ueda et al. | |
| 2004/0055317 A1 | 3/2004 | Nomura et al. | |
| 2005/0081606 A1 | 4/2005 | Taira | |
| 2008/0230738 A1 | 9/2008 | Minor et al. | |
| 2011/0219794 A1 | 9/2011 | Shiba | |
| 2012/0291457 A1 | 11/2012 | Brown et al. | |
| 2014/0260352 A1 | 9/2014 | Murray | |
| 2015/0159930 A1 | 6/2015 | Mcmasters et al. | |
| 2015/0338136 A1 | 11/2015 | Suzuki | |
| 2016/0084556 A1 | 3/2016 | Kato et al. | |
| 2016/0130490 A1 | 5/2016 | Kujak et al. | |
| 2018/0172329 A1 | 6/2018 | Taira | |
| 2019/0003755 A1 | 1/2019 | Crombie et al. | |

FOREIGN PATENT DOCUMENTS

| | | |
|---|---|---|
| CN | 104019525 A | 9/2014 |
| EP | 0 715 134 A2 | 6/1996 |
| EP | 0 789 199 A2 | 8/1997 |
| EP | 2602572 A1 | 6/2013 |
| EP | 2 698 585 A1 | 2/2014 |
| EP | 3 012 555 A1 | 4/2016 |
| JP | 63-129273 A | 6/1988 |
| JP | 2-157573 A | 6/1990 |
| JP | 4-273957 A | 9/1992 |
| JP | 6-341737 A | 12/1994 |
| JP | 8-121881 A | 5/1996 |
| JP | 8-145515 A | 6/1996 |
| JP | 8-296908 A | 11/1996 |
| JP | 8-303911 A | 11/1996 |
| JP | 8-327168 A | 12/1996 |
| JP | 9-72637 A | 3/1997 |
| JP | 9-113044 A | 5/1997 |
| JP | 9-217970 A | 8/1997 |
| JP | 10-311625 A | 11/1998 |
| JP | 11-173709 A | 7/1999 |
| JP | 11-201849 A | 7/1999 |
| JP | 2000-199660 A | 7/2000 |
| JP | 3360575 B2 | 12/2002 |
| JP | 2003-240388 A | 8/2003 |
| JP | 2004-12126 A | 1/2004 |
| JP | 2004-116875 A | 4/2004 |
| JP | 2004-116885 A | 4/2004 |
| JP | 2004-232951 A | 8/2004 |
| JP | 2005-127542 A | 5/2005 |
| JP | 2006-46446 A | 2/2006 |
| JP | 2006-207925 A | 8/2006 |
| JP | 2007-127325 A | 5/2007 |
| JP | 2008-202909 A | 9/2008 |
| JP | 2008-256254 A | 10/2008 |
| JP | 2009-222356 A | 10/2009 |
| JP | 2011-47556 A | 3/2011 |
| JP | 2011-94871 A | 5/2011 |
| JP | 2012-225525 A | 11/2012 |
| JP | 2014-77594 A | 5/2014 |
| JP | 2014-202451 A | 10/2014 |
| JP | 2015-14372 A | 1/2015 |
| JP | WO2013111180 A1 * | 5/2015 |
| JP | 5934482 B2 | 6/2016 |
| JP | 2017-32185 A | 2/2017 |
| JP | 2017-67383 A | 4/2017 |
| JP | 2017-141998 A | 8/2017 |
| JP | 2017-215140 A | 12/2017 |
| JP | 2018-501334 A | 1/2018 |
| KR | 10-1727540 B1 | 4/2017 |
| WO | WO 2014/196045 A1 | 12/2014 |
| WO | WO 2014/203355 A1 | 12/2014 |
| WO | WO 2017/027716 A1 | 2/2017 |
| WO | WO 2018/146719 A1 | 8/2018 |

OTHER PUBLICATIONS

Extended European Search Report for European Application No. 19865088.9, dated Oct. 11, 2021.
Extended European Search Report for European Application No. 19865862.7, dated Oct. 5, 2021.
Extended European Search Report for European Application No. 19867372.5, dated Oct. 11, 2021.
Extended European Search Report for European Application No. 19868034.0, dated Oct. 11, 2021.
International Preliminary Report on Patentability and English translation of the Written Opinion of the International Searching Authority, for International Application No. PCT/JP2019/037050, dated Apr. 8, 2021.

* cited by examiner

REFRIGERANT CHARGING METHOD, HEAT SOURCE UNIT, AND RENEWED REFRIGERATION CYCLE APPARATUS

TECHNICAL FIELD

The present disclosure relates to a method of charging a refrigerant to a refrigerant circuit in which a refrigeration cycle is to be performed by a circulating refrigerant, a heat source unit for configuring a refrigerant circuit in which a refrigeration cycle is to be performed, and a refrigeration cycle apparatus.

BACKGROUND ART

A refrigeration cycle apparatus including a refrigerant circuit in which a refrigeration cycle is to be performed is applied to an air conditioning apparatus, a boiler, and the like. As described in, for example, PTL 1 (Japanese Laid-Open Patent Application No. 2009-222356), operating a refrigeration cycle apparatus requires charging a refrigerant to a refrigerant circuit.

SUMMARY OF INVENTION

Technical Problem

However, it is required for the refrigeration cycle apparatus described in PTL 1 to transport an outdoor unit to the installation location of the refrigeration cycle apparatus when, for example, the outdoor unit, which is a heat source unit, is to be renewed. During transport of the outdoor unit, foreign materials, such as dust and oil, or moisture may enter the inside of the outdoor unit as a result of, for example, a plug being loosened.

Accordingly, in a heat source unit for configuring such a refrigeration cycle apparatus, there is a subject of avoiding a foreign material and moisture from entering the heat source unit until the refrigeration cycle apparatus is configured.

Solution to Problem

A refrigerant charging method according to a first aspect is a method of charging a refrigerant to a refrigerant circuit in which a refrigeration cycle is to be performed by a circulating refrigerant, the refrigerant circuit being configured by connecting a heat source unit and a utilization unit to each other, the method including: a step (a) of charging a first refrigerant to the heat source unit before connecting the heat source unit to the utilization unit to configure the refrigerant circuit; and a step (b) of connecting the heat source unit to the utilization unit and additionally charging a second refrigerant that differs from the first refrigerant to the refrigerant circuit to obtain the circulating refrigerant that includes the second refrigerant and the first refrigerant that is charged in the heat source unit.

In the refrigerant charging method according to the first aspect, due to the first refrigerant being charged in the heat source unit before the heat source unit is connected to the utilization unit to configure the refrigerant circuit, outside air is obstructed by the first refrigerant from entering the heat source unit, and it is thus possible to avoid a foreign material and moisture from mixing with outside air and entering the heat source unit.

A refrigerant charging method according to a second aspect is the refrigerant charging method according to the first aspect in which, in the step (a), the first refrigerant charged in the heat source unit has an absolute pressure that is more than or equal to an atmospheric pressure at 20° C. in the heat source unit.

In the refrigerant charging method according to the second aspect, due to the heat source unit being charged with the first refrigerant having the absolute pressure more than or equal to the atmospheric pressure, outside air does not easily enter the heat source unit, and it is thus possible to improve the effect of avoiding a foreign material, moisture, and the like from mixing with outside air and entering the heat source unit.

A refrigerant charging method according to a third aspect is the refrigerant charging method according to the second aspect in which, in the step (a), the first refrigerant charged in the heat source unit has an absolute pressure that is less than 1 MPa at 35° C. in the heat source unit.

In the refrigerant charging method according to the third aspect, due to the absolute pressure of the first refrigerant charged in the heat source unit being less than 1 MPa, which is low, it is possible to prevent entrance of outside air with a small amount of charging, compared with when the first refrigerant that has a high pressure more than or equal to 1 MPa is charged.

A refrigerant charging method according to a fourth aspect is the refrigerant charging method according to any of the first aspect to the third aspect in which the first refrigerant is an R32 refrigerant, and the second refrigerant includes an R410A refrigerant.

In the refrigerant charging method according to the fourth aspect, due to the components of the R410A refrigerant including difluoromethane, it is possible to use the R32 refrigerant charged in the heat source unit as it is, without extracting the R32 refrigerant therefrom, with respect to the refrigerant circuit compatible with the second refrigerant including pentafluoroethane, which is the other component of the R410A refrigerant, and difluoromethane, and therefore, time and labor in refrigerant charging are saved.

A refrigerant charging method according to a fifth aspect is the refrigerant charging method according to any of the first aspect to the fourth aspect in which the circulating refrigerant is non-flammable.

In the refrigerant charging method according to the fifth aspect, due to the circulating refrigerant being non-flammable, it is possible to use the circulating refrigerant as it is when, for example, a refrigeration cycle apparatus after renewal is an apparatus intended for a non-flammable refrigerant.

A refrigerant charging method according to a sixth aspect is the refrigerant charging method according to any of the first aspect to the fifth aspect, the method further including, after the step (a), a step (c) of transporting the heat source unit with the first refrigerant charged therein to a location where the heat source unit is to be connected to configure the refrigerant circuit.

In the refrigerant charging method according to the sixth aspect, due to the heat source unit being transported with the first refrigerant charged therein to the installation location, outside air is obstructed by the first refrigerant from entering the heat source unit during transport, and it is thus possible to avoid a foreign material, moisture, and the like from mixing with outside air during transport and entering the heat source unit. Moreover, there is no need to extract the R32 refrigerant when the heat source unit is to be connected to the refrigerant circuit, and thus, time and labor in charging work are saved.

A refrigerant charging method according to a seventh aspect is the refrigerant charging method according to the sixth aspect in which, before the step (b) is performed, a connection pipe connected to the utilization unit and/or the heat source unit is connected to another heat source unit other than the heat source unit at the location and configures another refrigerant circuit that differs from the refrigerant circuit, and in which, in the step (b), a recovered refrigerant recovered from the other refrigerant circuit is charged as the second refrigerant to the refrigerant circuit.

In the refrigerant charging method according to the seventh aspect, due to the recovered refrigerant being charged as the second refrigerant to the refrigerant circuit in the step (b), it is possible to reutilize the recovered refrigerant in the refrigerant circuit and possible to effectively utilize the recovered refrigerant.

A heat source unit according to an eighth aspect is a heat source unit for configuring a refrigerant circuit in which a refrigeration cycle is to be performed by a circulating refrigerant, the heat source unit including: a heat-source-side circuit for configuring a portion of the refrigerant circuit, and a first refrigerant charged in the heat-source-side circuit that is before configuring the portion of the refrigerant circuit, in which the heat-source-side circuit is configured to cause, in a state of being the portion of the refrigerant circuit, the circulating refrigerant to circulate in the refrigerant circuit, the circulating refrigerant including the first refrigerant and a second refrigerant that is charged to the refrigerant circuit.

In the heat source unit according to the eighth aspect, due to the first refrigerant being charged in the heat source unit before the utilization unit and the heat source unit are connected to each other, outside air is obstructed by the first refrigerant from entering the heat source unit, and it is thus possible to avoid a foreign material, moisture, and the like from mixing with outside air and entering the heat source unit.

A heat source unit according to a ninth aspect is the heat source unit according to the eighth aspect in which the first refrigerant has an absolute pressure that is more than or equal to an atmospheric pressure at 20° C. in the heat-source-side circuit.

In the heat source unit according to the ninth aspect, due to the heat source unit being charged with the first refrigerant having the absolute pressure more than or equal to the atmospheric pressure, outside air does not easily enter the heat-source-side circuit, and it is thus possible to improve the effect of avoiding a foreign material, moisture, and the like from mixing with outside air and entering the heat-source-side circuit.

A heat source unit according to a tenth aspect is the heat source unit according to the eighth aspect or the ninth aspect in which the first refrigerant is an R32 refrigerant, and the second refrigerant is an R410A refrigerant.

In the heat source unit according to the tenth aspect, due to the components of the R410A refrigerant including difluoromethane, it is possible to use the R32 refrigerant that is charged in the heat-source-side circuit as it is, without extracting the R32 refrigerant, with respect to the refrigerant circuit compatible with the second refrigerant including pentafluoroethane, which is the other component of the R410A refrigerant, and difluoromethane, and therefore, time and labor in connection of the heat source unit are saved.

A renewed refrigeration cycle apparatus according to an eleventh aspect is a renewed refrigeration cycle apparatus that is an already installed refrigeration cycle apparatus in which a refrigeration cycle is to be performed by a circulating refrigerant, the renewed installed refrigeration cycle apparatus including a second heat source unit that replaces a first heat source unit of the already installed refrigeration cycle apparatus, in which the second heat source unit is the heat source unit according to any of the eighth aspect to the tenth aspect, and in which a connection pipe connected to the first heat source unit in the already installed refrigeration cycle apparatus is connected to the second heat source unit to thereby configure a refrigerant circuit in which the circulating refrigerant that performs the refrigeration cycle flows.

In the renewed refrigeration cycle apparatus according to the eleventh aspect, due to the connection pipe of the already installed refrigeration cycle apparatus being used in the refrigerant circuit, it is possible to reduce costs for obtaining the apparatus, compared with when a new connection pipe is used.

DESCRIPTION OF EMBODIMENTS (1) Overall Configuration

Figure 1:
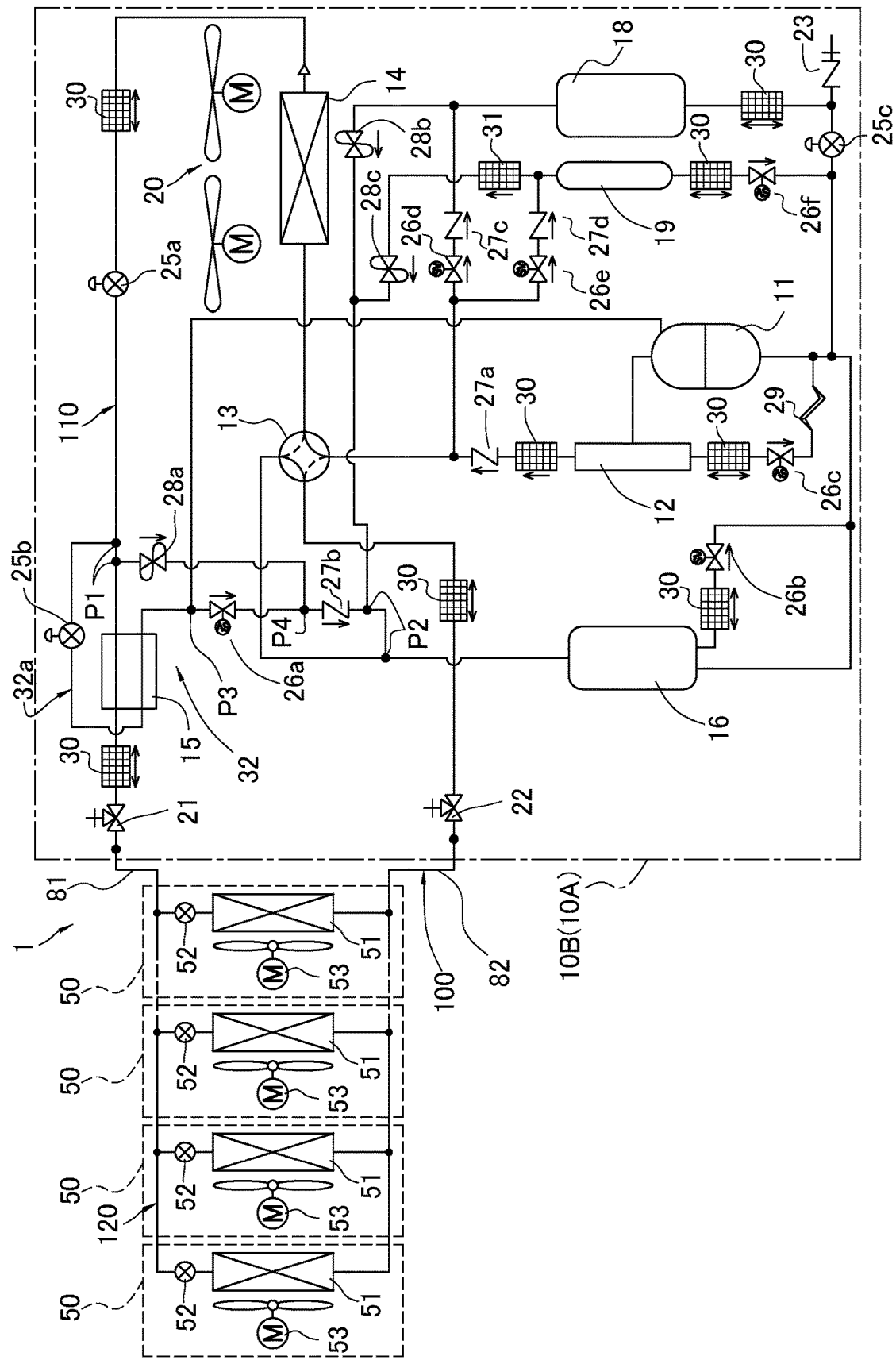
FIG. 1 is a refrigerant circuit diagram illustrating an outline of the configuration of a refrigeration cycle apparatus according to an embodiment.

In FIG. 1, an example of the configuration of a refrigeration cycle apparatus that is to be an object of a refrigerant charging method is illustrated. As illustrated in FIG. 1, a refrigeration cycle apparatus 1 is an apparatus in which a refrigeration cycle is to be performed by a refrigerant that circulates in a refrigerant circuit 100. The refrigeration cycle apparatus 1 repeats a cycle of compression of a refrigerant, heat radiation from the refrigerant, decompression expansion of the refrigerant, and heat absorption into the refrigerant. The refrigeration cycle apparatus 1 includes a first heat source unit 10A or a second heat source unit 10B switchable to have a function of heat radiation or to have a function of heat absorption in the refrigeration cycle, and a utilization unit 50 connected to the first heat source unit 10A or the second heat source unit 10B. Here, the first heat source unit 10A is a heat source unit before renewal, and the second heat source unit 10B is a heat source unit after renewal.

The utilization unit 50 cools an object by utilizing heat absorption of a refrigerant when the first heat source unit 10A or the second heat source unit 10B is a heat source whose heat is radiated from the refrigerant. The utilization unit 50 heats an object by utilizing heat radiation of the refrigerant when the first heat source unit 10A or the second heat source unit 10B is a heat source whose heat is absorbed by the refrigerant.

The refrigeration cycle apparatus 1 is applicable to an air conditioning apparatus that performs cooling and heating. In this case, for example, the first heat source unit 10A or the second heat source unit 10B serves as an outdoor unit of the air conditioning apparatus, and the utilization unit 50 serves as an indoor unit of the air conditioning apparatus. The utilization unit 50 that is the indoor unit cools or heats air in an air-conditioning object space to perform cooling or heating. Note that, although a case in which the refrigeration cycle apparatus 1 is applied to an air conditioning apparatus is presented as an example and described here, the refrigeration cycle apparatus is also applicable to other apparatuses, for example, a heat pump boiler, a refrigerator, and a cooling apparatus that cools inside a chamber.

Figure 2:
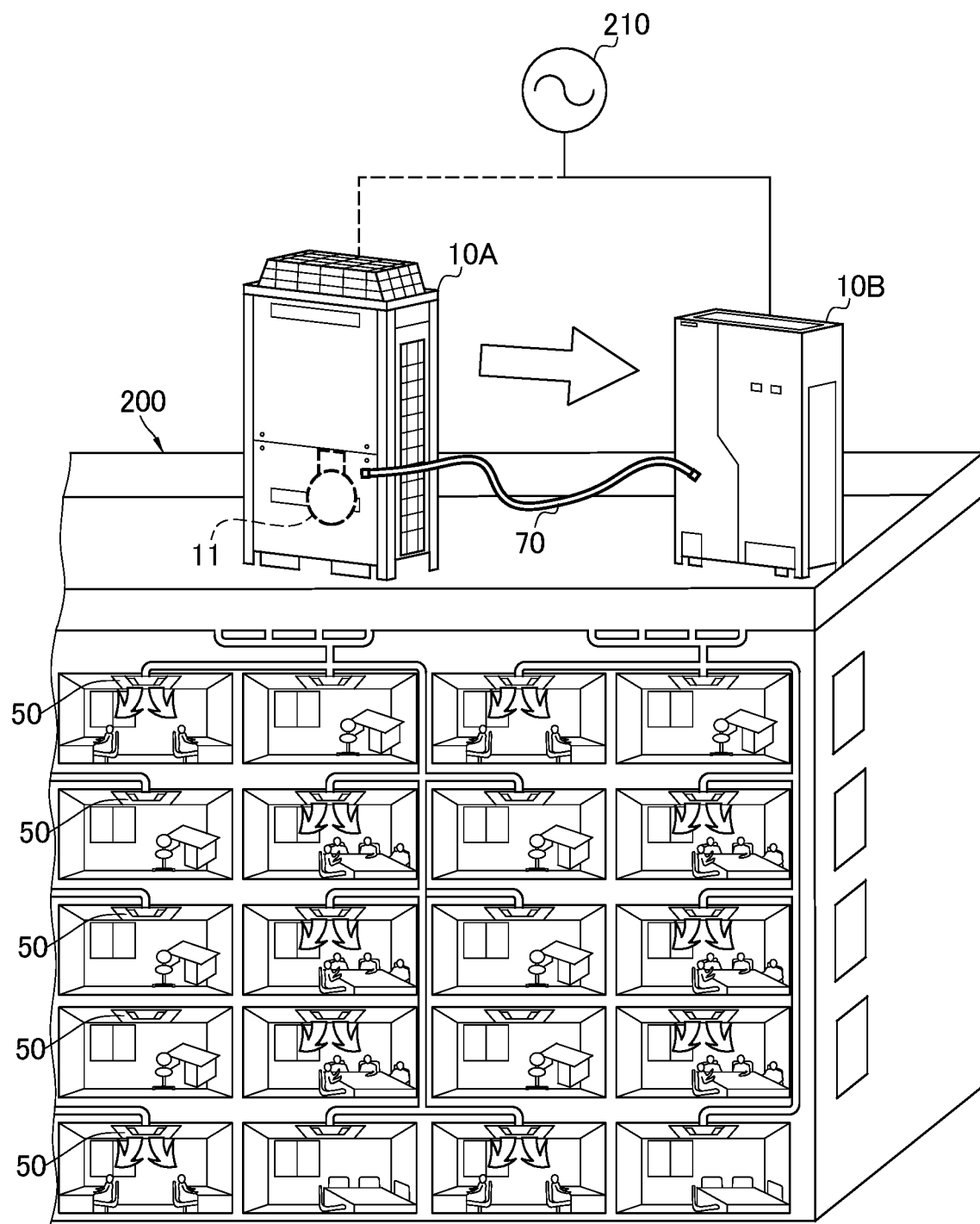
FIG. 2 is a schematic diagram for describing transfer of a refrigerant from a first heat source unit to a second heat source unit.
Figure 3:
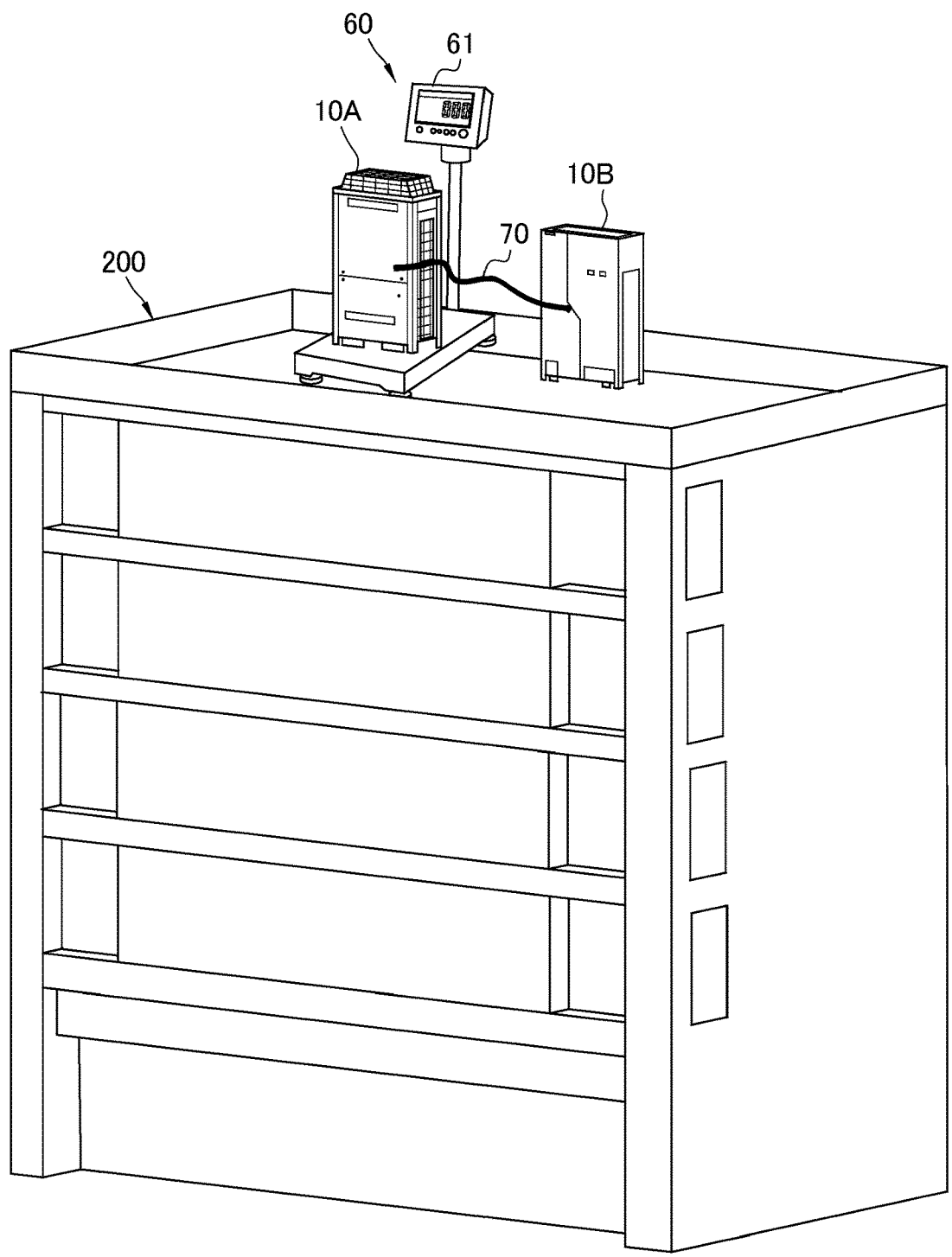
FIG. 3 is a schematic diagram for describing measurement of the weight of a refrigerant transferred from the first heat source unit to the second heat source unit.

In FIG. 2 and FIG. 3, regarding a case in which the refrigeration cycle apparatus 1 is an air conditioning apparatus, an example in which the refrigeration cycle apparatus 1 is installed at a building 200 is illustrated. In the example illustrated in FIG. 2, the first heat source unit 10A or the second heat source unit 10B is installed at the rooftop of the building 200. As illustrated in FIG. 2, a plurality of utilization units 50 are installed in respective rooms to perform air conditioning of each room in the building 200.

In FIG. 2 and FIG. 3, the first heat source unit 10A before renewal included in the already installed refrigeration cycle apparatus 1 and the second heat source unit 10B that is planned to be included in the refrigeration cycle apparatus 1 after renewal are illustrated. In other words, the first heat source unit 10A is an old heat source unit, and the second heat source unit 10B is a new heat source unit. The already installed refrigeration cycle apparatus 1 has already been installed at the building 200 and has an experience of performing a refrigeration cycle by circulating a refrigerant before renewal. A refrigerant is present in each of the first heat source unit 10A and the plurality of utilization units 50 included in the refrigeration cycle apparatus 1. Here, a refrigerant that is included in the inner portion of the refrigeration cycle apparatus 1 for the purpose of circulating in the refrigerant circuit 100 is referred to as a circulating refrigerant.

As described in the flowchart in FIG. 4, a refrigerant charging method, which will be described below, for the above-described refrigeration cycle apparatus 1 is configured to include a step S1 of charging a single refrigerant to the second heat source unit 10B before connecting the second heat source unit 10B to the utilization units 50 to configure the refrigerant circuit 100 and a step S6 of connecting the second heat source unit to the utilization units 50 to configure the refrigerant circuit 100 and additionally charging a mixed refrigerant to the refrigerant circuit to obtain a circulating refrigerant that includes the mixed refrigerant and the single refrigerant that is charged in the second heat source unit 10B.

In the following description of an embodiment, a case in which the mixed refrigerant is an R410A refrigerant and the single refrigerant is an R32 refrigerant is presented as an example and described. The R410A refrigerant is a mixed refrigerant of difluoromethane and pentafluoroethane, and a recovered refrigerant is also a mixed refrigerant, as with the R410A refrigerant. The R32 refrigerant is a single refrigerant of fluoromethane and in coincidence with one of the components of R410A.

A long period of use of the R410A refrigerant in the already installed refrigeration cycle apparatus 1 may change the mixture ratio of difluoromethane and pentafluoroethane with a lapse of time. The range of the change in the mixture ratio of difluoromethane and pentafluoroethane can be estimated, although including errors, through an experiment, a simulation, or the like. The already installed refrigeration cycle apparatus 1 in which the first heat source unit 10A is incorporated has an allowable range in which operation is possible even when the mixture ratio of difluoromethane and pentafluoroethane occupying the circulating refrigerant changes from that in the initial R410A refrigerant. Similarly, the refrigeration cycle apparatus 1 after renewal including the second heat source unit 10B also has an allowable range regarding the mixture ratio of difluoromethane and pentafluoroethane so as to be able to operate even when the mixture ratio of difluoromethane and pentafluoroethane is not the same, which is 1:1, as that in the R410A.

Accordingly, the refrigeration cycle apparatus 1 after renewal operates normally if the mixture ratio of difluoromethane and pentafluoroethane of the circulating refrigerant after the addition of the R32 refrigerant to the recovered refrigerant is within the allowable range of the refrigeration cycle apparatus 1 after renewal.

Figure 5:
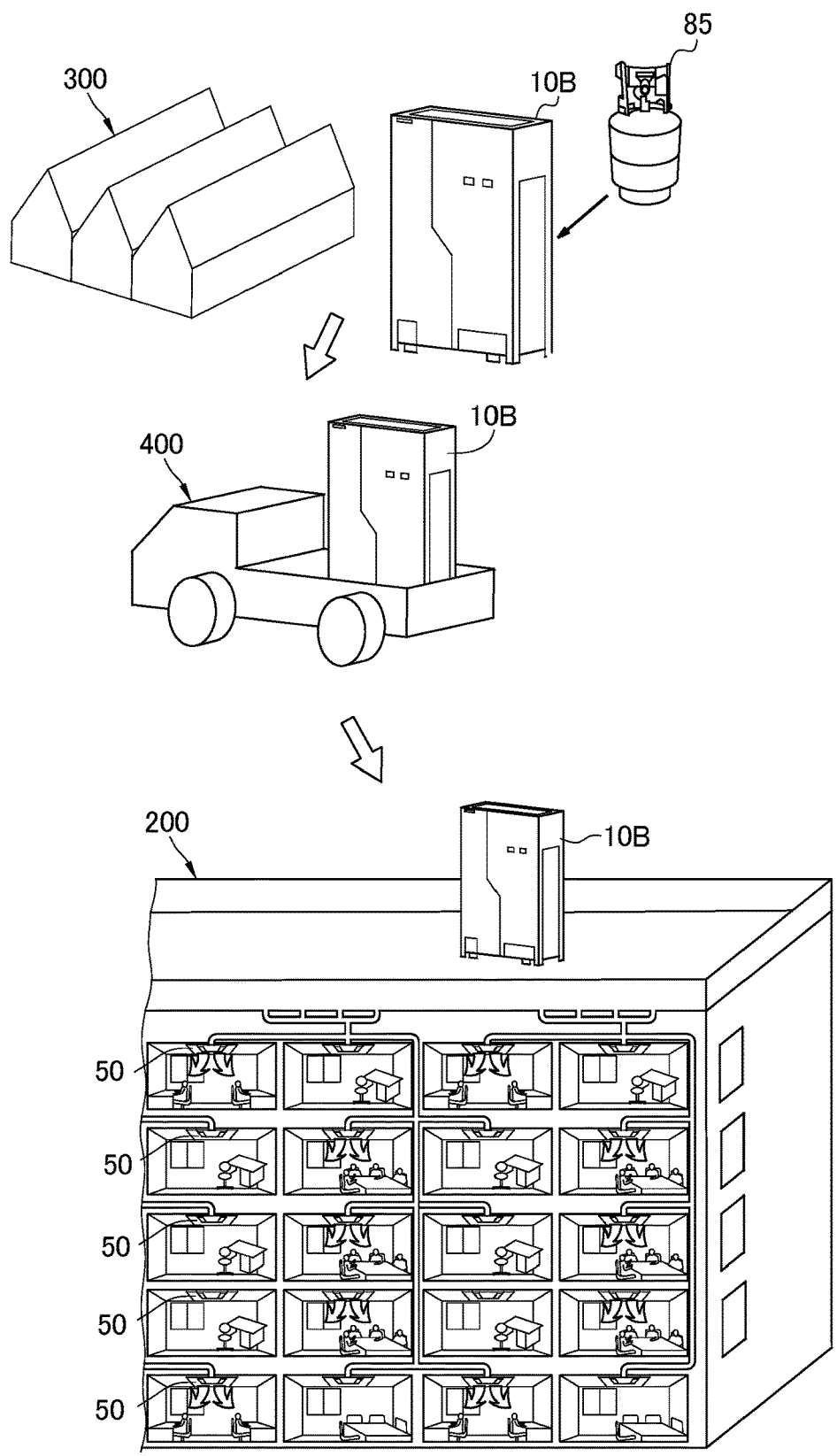
FIG. 5 is a conceptual diagram for describing transport of the second heat source unit.

As illustrated in FIG. 5, first, the R32 refrigerant prepared in a cylinder 85 or the like is charged at a charge location 300, such as a factory, to the second heat source unit 10B (step S1). With the R32 refrigerant charged therein, the second heat source unit 10B is transported to the rooftop of the building 200, which is a location where the utilization units 50 is to be connected to configure the refrigerant circuit 100, by using transport means 400, such as a truck and a crane.

The single refrigerant, which is the R32 refrigerant here, charged in the second heat source unit 10B is preferably charged to an amount to have an absolute pressure that is more than or equal to the atmospheric pressure at 20° C. in the second heat source unit 10B. This is because, when the pressure inside a heat-source-side circuit 110 is more than or equal to the atmospheric pressure, entrance of outside air from outside of the second heat source unit 10B toward inside of the refrigerant circuit 100 becomes difficult. The single refrigerant, which is the R32 refrigerant here, charged in the second heat source unit 10B is preferably charged by an amount to have an absolute pressure that is less than 1 MPs at 35° C. in the second heat source unit 10B. Such a configuration makes it possible to prevent entrance of outside air with a small amount of charging. Further, the pressure of the single refrigerant charged in the second heat source unit 10B is preferably less than 200 kPa at a gauge pressure at 20° C. Employing such a configuration makes it possible to prevent entrance of outside air with a smaller amount of charging.

In a state in which the circulating refrigerant of the refrigeration cycle apparatus 1 has been transferred to the first heat source unit 10A through pump down operation, the first heat source unit 10A is detached from the refrigeration cycle apparatus 1 at the rooftop of the building 200 (step S2). When the first heat source unit 10A is to be detached, a high-pressure-side shutoff valve 21 and a low-pressure-side shutoff valve 22 of the first heat source unit 10A are closed.

Next, the second heat source unit 10B is incorporated in the refrigeration cycle apparatus 1 (step S3). With respect to the refrigeration cycle apparatus 1 after renewal in which the second heat source unit 10B is incorporated, for example, airtightness of the refrigeration cycle apparatus 1 is inspected, and, after the airtightness of the refrigeration cycle apparatus 1 is confirmed, the refrigeration cycle apparatus 1 is evacuated by a vacuum pump.

In FIG. 2, a state in which the refrigerant is transferred from the first heat source unit 10A to the second heat source unit 10B is schematically illustrated. In a state of being incorporated in the refrigeration cycle apparatus 1 that is after renewal, the second heat source unit 10B is connected to a power source 210 and in an operable state. The first heat source unit 10A and the second heat source unit 10B are connected to each other by a charge hose 70. In response to the operation of the second heat source unit 10B, the R410A refrigerant is transferred from the first heat source unit 10A through the charge hose 70 to the second heat source unit 10B. Through this transfer of the refrigerant from the first heat source unit 10A to the second heat source unit 10B, a recovered refrigerant is obtained (step S4). At this time, the first heat source unit 10A is, for example, in a state of being temporarily placed at the rooftop of the building 200 and is not connected to the power source 210.

In FIG. 3, a state in which the weight of the recovered refrigerant recovered in the second heat source unit 10B from the first heat source unit 10A is measured is illustrated. The weight of the first heat source unit 10A is measured by a scale 61. The scale 61 measures the recovered refrigerant recovered from the first heat source unit 10A by measuring the weight of the first heat source unit 10A both of before the recovered refrigerant is transferred from the first heat source unit 10A and after the recovered refrigerant is transferred from the first heat source unit 10A. The weight of the recovered refrigerant can be calculated by subtracting a measured value obtained by the scale 61 regarding the first heat source unit 10A that is before transfer of the recovered refrigerant from the first heat source unit 10A from a measured value obtained by the scale 61 regarding the first heat source unit 10A that is after transfer of the recovered refrigerant from the first heat source unit 10A (step S5).

As a result of the second heat source unit 10B to which the recovered refrigerant has been transferred being incorporated in the refrigeration cycle apparatus 1, transfer of the recovered refrigerant to the refrigeration cycle apparatus 1 is completed. The recovered refrigerant (a mixed refrigerant of difluoromethane and pentafluoroethane) that has been recovered is thus additionally charged to the refrigeration cycle apparatus 1, and a circulating refrigerant including the recovered refrigerant, which is a mixed refrigerant, and the R32 refrigerant (the single refrigerant previously charged in the second heat source unit 10B) is obtained (step S6).

The gross weight of the refrigerants proper for the refrigeration cycle apparatus 1 after renewal in which the second heat source unit 10B is incorporated can be previously calculated by using data of the already installed refrigeration cycle apparatus 1 in which the first heat source unit 10A is incorporated. It is possible to obtain the weight of a lacking refrigerant and to determine the charge amount of the R32 refrigerant by subtracting the weight of the recovered refrigerant measured by a measurement system 60 in step S4 from the gross weight of the refrigerants proper for the refrigeration cycle apparatus 1 after renewal. Since an already charged amount of the R32 refrigerant is present in the second heat source unit 10B in the transport step, it is sufficient to add an additional R32 refrigerant of an amount obtained by subtracting the already charged amount from the amount of the lacking refrigerant. When the additional R32 refrigerant is to be thus added, the additional R32 refrigerant may be added to the recovered refrigerant. When the gross weight of the refrigerants proper for the refrigeration cycle apparatus 1 after renewal is set in a prescribed range, calculation may be performed by using, for example, a median value of the prescribed range. When the total weight of the R32 refrigerant previously charged in the second heat source unit 10B and the recovered refrigerant is within the prescribed range, it is also possible to take a measure of adding no additional refrigerant.

The refrigerant charging work from the step S2 to the step S6 described above is performed at, for example, a local site. Here, performing the refrigerant charging work from the step S2 to the step S6 at a local site means that the recovered refrigerant is not taken back to facilities, such as a factory, and the recovered refrigerant as it is or treated at the installation location of the refrigeration cycle apparatus 1 is recharged to the refrigeration cycle apparatus 1 after renewal. In the above-described case, the work from the step S2 to the step S6 is performed, for example, at the rooftop of the building 200. When the refrigerant charging work from the step S2 to the step S6 is to be performed at a local site, the refrigerant charging work is preferably performed within one day and is more preferably performed during the daytime of one day. This is because an environmental change is small, a work object is easily visually recognized, and leakage of refrigerant and mixing of a foreign material into the refrigeration cycle apparatus 1 are easily prevented.

(2) Detailed Configuration (2-1) Configuration of Refrigeration Cycle Apparatus 1

In the refrigeration cycle apparatus 1 illustrated in FIG. 1, one first heat source unit 10A or one second heat source unit 10B and a plurality of the utilization units 50 are connected by connection pipes 81 and 82. In the refrigeration cycle apparatus 1, the heat-source-side circuit 110 in the first heat source unit 10A or the second heat source unit 10B and a utilization-side circuit 120 in each utilization unit 50 are connected to each other, thereby configuring the refrigerant circuit 100. In the refrigeration cycle apparatus 1, circulation of the refrigerant in the refrigerant circuit 100 causes a vapor compression refrigeration cycle to repeat. An example in which the refrigeration cycle apparatus 1 is applied to an air conditioning apparatus will be described here.

(2-1-1) First Heat Source Unit 10A, Second Heat Source Unit 10B

To simplify the description, a case in which the first heat source unit 10A before renewal and the second heat source unit 10B after renewal have the same configuration will be described here; however, the technology according to the present disclosure is applicable, even when the configurations thereof are not same. For example, as illustrated in FIG. 1, each of the first heat source unit 10A and the second heat source unit 10B includes a compressor 11, an oil separator 12, a four-way valve 13, a heat-source-side heat exchanger 14, a subcooling heat exchanger 15, an accumulator 16, a refrigerant regulator 18, an oil regulator 19, a heat-source-side fan 20, the high-pressure-side shutoff valve 21, the low-pressure-side shutoff valve 22, a charge port 23, a first expansion valve 25a to a third expansion valve 25c, a first electromagnetic valve 26a to a sixth electromagnetic valve 26f, a first check valve 27a to a fourth check valve 27d, a first pressure regulating valve 28a to a third pressure regulating valve 28c, a capillary tube 29, a plurality of filters 30, and a strainer 31.

The heat-source-side heat exchanger 14 is, for example, a fin-and-tube heat exchanger and exchanges heat between air and a refrigerant. For example, a plate heat exchanger is usable as the subcooling heat exchanger 15. The first electromagnetic valve 26a to the sixth electromagnetic valve 26f each have a function of opening and closing a flow path. The first pressure regulating valve 28a to the third pressure regulating valve 28c each have a function of keeping the pressure of the refrigerant on the upstream side at a prescribed absolute pressure that is previously determined. The tips of the arrows given to the first pressure regulating valve 28a to the third pressure regulating valve 28c indicate the downstream side of the first pressure regulating valve 28a to the third pressure regulating valve 28c. The filters 30 each have a function of removing a foreign material from the refrigerant that passes therethrough. The strainer 31 has a function of removing a solid component from the refrigerant.

The discharge side of the compressor 11 is connected to the first port of the four-way valve 13 via the oil separator 12 and a first check valve 27a. The refrigerant discharged from the compressor 11 is separated from the oil at the oil separator 12 and flows toward the first port of the four-way valve 13. The second port of the four-way valve 13 is connected to one entrance of the heat-source-side heat exchanger 14, the third port of the four-way valve 13 is connected to an inlet of the accumulator 16, and the fourth port of the four-way valve 13 is connected to the low-pressure-side shutoff valve 22. In the four-way valve 13, the first port and the second port are in communication with each other while the third port and the fourth port are in communication with each other, as indicated by solid lines, during cooling operation, and the first port and the fourth port are in communication with each other while the second port and the third port are in communication with each other, as indicated by broken lines, during heating operation.

The other entrance of the heat-source-side heat exchanger 14 is connected to one end of the first expansion valve 25a and connected to the high-pressure-side shutoff valve 21 via the first expansion valve 25a. The subcooling heat exchanger 15 is installed between the other end of the first expansion valve 25a and the high-pressure-side shutoff valve 21. The first expansion valve 25a is provided on the liquid side of the heat-source-side heat exchanger 14 and able to regulate the degree of decompression of the refrigerant that passes therethrough. The subcooling heat exchanger 15, a subcooling circuit 32a, and a second expansion valve 25b constitute a subcooling portion 32. The subcooling circuit 32a diverges from a diverging point P1 at a part extending from the other end of the first expansion valve 25a toward the high-pressure-side shutoff valve 21 and merges, through the subcooling heat exchanger 15, with a merging point P2 between the four-way valve 13 and the accumulator 16. The second expansion valve 25b provided between the diverging point P1 and the subcooling heat exchanger 15 is able to regulate the degree of decompression of the refrigerant that passes through the subcooling circuit 32a. The subcooling heat exchanger 15 causes heat to be exchanged between the refrigerant that flows between the diverging point P1 and the high-pressure-side shutoff valve 21 and the refrigerant that flows from the diverging point P1 toward the merging point P2 in the subcooling circuit 32a.

A diverging point P3, the first electromagnetic valve 26a, a merging point P4, and the second check valve 27b are provided in this order from the subcooling heat exchanger 15 toward the merging point P2 in the subcooling circuit 32a. The diverging point P1 and the merging point P4 are connected to each other via the first pressure regulating valve 28a, and the refrigerant flows from the diverging point P1 toward the merging point P4. The diverging point P3 is connected to an injection port of the compressor 11. Accordingly, an intermediate-pressure refrigerant decompressed at the second expansion valve 25b exits from the subcooling heat exchanger 15, diverges on the upstream of the first electromagnetic valve 26a, and flows into the injection port of the compressor 11.

One outlet of the accumulator 16 is directly connected to the suction side of the compressor 11 to return a gas refrigerant to the suction side of the compressor 11, and the other outlet of the accumulator 16 is connected for oil-returning to the suction side of the compressor 11 via the filters 30 and a second electromagnetic valve 26b. Between the suction side of the compressor 11 and the oil separator 12, a path that passes the filters 30, a third electromagnetic valve 26c, and the capillary tube 29 is formed to return the separated oil to the compressor 11.

One entrance of the refrigerant regulator 18 is connected to the suction side of the compressor 11 via the third expansion valve 25c. The refrigerant regulator 18 is a device that regulates the amount of the refrigerant that flows in the refrigerant circuit 100. The other entrance of the refrigerant regulator 18 is connected to the merging point P2 via the second pressure regulating valve 28b. The outflow side of the first check valve 27a is connected to the other entrance of the refrigerant regulator 18 via the fourth electromagnetic valve 26d and the third check valve 27c. The refrigerant regulator 18 has a function of keeping the amount of the refrigerant that flows in the refrigerant circuit 100 to be constant.

One entrance of the oil regulator 19 is connected to the suction side of the compressor 11 via the sixth electromagnetic valve 26f. The other entrance of the oil regulator 19 is connected to the merging point P2 via the third pressure regulating valve 28c. The outflow side of the first check valve 27a is connected to the other entrance of the oil regulator 19 via the fifth electromagnetic valve 26e and the fourth check valve 27d. The oil regulator 19 has a function of keeping the amount of oil supplied to the refrigerant circuit 100 to be constant.

The heat-source-side fan 20 is disposed at the heat-source-side heat exchanger 14. The heat-source-side fan 20 causes an airflow for accelerating heat exchange to be generated in the heat-source-side heat exchanger 14.

The filters 30 are provided between the oil separator 12 and the first check valve 27a, between the heat-source-side heat exchanger 14 and the first expansion valve 25a, between the subcooling heat exchanger 15 and the high-pressure-side shutoff valve 21, between the fourth port of the four-way valve 13 and the low-pressure-side shutoff valve 22, between the other outlet of the accumulator 16 and the second electromagnetic valve 26b, between the oil separator 12 and the third electromagnetic valve 26c, between the third expansion valve 25c and the refrigerant regulator 18, and between the oil regulator 19 and the sixth electromagnetic valve 26f. The strainer 31 is provided between the oil regulator 19 and the third pressure regulating valve 28. The charge port 23 is provided between the third expansion valve 25c and the filters 30.

(2-1-2) Utilization Units 50

As illustrated in FIG. 1, each of the utilization units 50 includes, for example, a utilization-side heat exchanger 51, a utilization-side expansion valve 52, and a utilization-side fan 53. The utilization-side heat exchanger 51 is, for example, a fin-and-tube heat exchanger and causes heat to be exchanged between air and a refrigerant. The utilization-side expansion valve 52 and the utilization-side heat exchanger 51 are series connected between the liquid-side connection pipe 81 and the gas-side connection pipe 82. The utilization-side expansion valve 52 and the utilization-side heat exchanger 51 are disposed in the order of the utilization-side expansion valve 52 and the utilization-side heat exchanger 51 from the liquid-side connection pipe 81 toward the gas-side connection pipe 82. The utilization-side fan 53 is disposed at each utilization-side heat exchanger 51. The utilization-side fan 53 causes an airflow for accelerating heat exchange to be generated in the utilization-side heat exchanger 51. The plurality of utilization units 50 parallel connected between the liquid-side connection pipe 81 and the gas-side connection pipe 82 constitute the utilization-side circuit 120.

(2-1-3) Cooling Operation

In cooling operation, the refrigeration cycle apparatus 1 causes the four-way valve 13 to be in the state indicated by the solid lines, in other words, in a state in which the first port and the second port are in communication each other while the third port and the fourth port are in communication with each other. In the refrigeration cycle performed in cooling operation, the heat-source-side heat exchanger 14 functions as a radiator, and the utilization-side heat exchanger 51 functions as an evaporator. The refrigerant discharged from the compressor 11 successively circulates in the heat-source-side heat exchanger 14, the utilization-side expansion valves 52, and the utilization-side heat exchangers 51 and repeats the vapor compression refrigeration cycle of compression, condensation, expansion, and evaporation.

The refrigeration cycle apparatus 1 controls the operation frequency of the compressor 11 to cause the evaporation pressure or the evaporation temperature in the utilization-side heat exchanger 51 to be a target pressure or a target evaporation temperature and controls the valve opening degree of each utilization-side expansion valve 52 to cause the degree of superheating of the refrigerant that flows on the gas side of the utilization-side heat exchanger 51 to be a target degree of superheating. In cooling operation, the first expansion valve 25a is in the fully opened state. The refrigeration cycle apparatus 1 regulates the opening degree of the second expansion valve 25b to cause the degree of superheating of the refrigerant that has exited from the subcooling heat exchanger 15 to be a target degree of superheating. When a prescribed condition is satisfied, the refrigeration cycle apparatus 1 causes the refrigerant that flows in the subcooling circuit 32a to exchange heat in the subcooling heat exchanger 15 with the refrigerant that flows between the diverging point P1 and the high-pressure-side shutoff valve 21 and to become a gas refrigerant having an intermediate pressure and supplies, through the injection port, the refrigerant to a compression chamber in the middle of compression of the compression mechanism of the compressor 11. The compressor 11 that has been supplied with the gas refrigerant having the intermediate pressure can decrease the discharge temperature, compared with when injection of the gas refrigerant is not performed.

(2-1-4) Heating Operation

In heating operation, the refrigeration cycle apparatus 1 causes the four-way valve 13 to be in the state indicated by the broken lines, in other words, in a state in which the first port and the fourth port are in communication with each other while the second port and the third port are in communication with each other. In the refrigeration cycle performed in heating operation, the heat-source-side heat exchanger 14 functions as an evaporator, and the utilization-side heat exchanger 51 functions as a radiator. The refrigerant discharged from the compressor 11 successively circulates in the utilization-side heat exchanger 51, the first expansion valve 25a, and the heat-source-side heat exchanger 14 and repeats the vapor compression refrigeration cycle of compression, condensation, expansion, and evaporation.

In heating operation, the second expansion valve 25b is in a fully closed state. The refrigeration cycle apparatus 1 controls the operation frequency of the compressor 11 to cause the condensation temperature in the utilization-side heat exchanger 51 to be a target condensation temperature and controls the valve opening degree of the utilization-side expansion valve 52 to cause the degree of subcooling of the refrigerant that flows on the liquid side of the utilization-side heat exchanger 51 to be a target degree of subcooling. The refrigeration cycle apparatus 1 controls the valve opening degree of the first expansion valve 25a to cause the degree of superheating of the refrigerant that flows on the gas side of the heat-source-side heat exchanger 14 to be a target degree of superheating.

(2-2) Measurement System 60

The measurement system 60 includes the scale 61, which is illustrated in FIG. 3. The scale 61 is, for example, a platform weighing scale or a crane weighing scale. The scale 61 has a function capable of measuring the weight of the first heat source unit 10A or the second heat source unit 10B and has resolving power sufficient for detecting the weight of the refrigerant.

(2-3) Transfer of Refrigerant

In the transfer of the refrigerant from the first heat source unit 10A to the second heat source unit 10B, for example, with the first heat source unit 10A being incorporated in the refrigeration cycle apparatus 1 and being in an operable state, the refrigerant of the utilization-side circuit 120 is transferred to the heat-source-side circuit 110 of the first heat source unit 10A through pump down operation. Then, the high-pressure-side shutoff valve 21 and the low-pressure-side shutoff valve 22 of the first heat source unit 10A are closed. In the state in which the high-pressure-side shutoff valve 21 and the low-pressure-side shutoff valve 22 of the first heat source unit 10A are closed after the pump down operation, the first heat source unit 10A is detached and made to be in a temporarily placed state. In the pump down operation, for example, the high-pressure-side shutoff valve 21 is closed, and the first heat source unit 10A is operated to perform cooling. The high-pressure-side shutoff valve 21 is closed, and operation in which the heat-source-side heat exchanger 14 of the first heat source unit 10A functions as a condenser is performed. When the pressure of the low-pressure-side shutoff valve 22 becomes sufficiently low, the low-pressure-side shutoff valve 22 is closed.

After the first heat source unit 10A is detached from the refrigeration cycle apparatus 1, the second heat source unit 10B is incorporated in the refrigeration cycle apparatus 1. Then, as illustrated in FIG. 2, a service port of the high-pressure-side shutoff valve 21 of the first heat source unit 10A and the charge port 23 of the second heat source unit 10B are connected to each other by the charge hose 70. Here, a means of transferring the refrigerant includes the charge hose 70. The second heat source unit 10B is operated to drive the compressor 11, and the refrigerant is transferred through the service port of the high-pressure-side shutoff valve 21 of the first heat source unit 10A into the charge port 23 of the second heat source unit 10B. When the second heat source unit 10B is to be operated to drive the compressor 11, the third expansion valve 25c is closed, cooling operation is performed, and the recovered refrigerant is sucked along a path in which the recovered refrigerant is sucked from the refrigerant regulator 18 by the compressor 11 through the accumulator 16. By detaching the charge hose 70 from the charge port 23 and the service port of the high-pressure-side shutoff valve 21, the charge port 23 and the service port of the high-pressure-side shutoff valve 21 are closed.

(3) Modifications (3-1) Modification 1A

In the aforementioned embodiment, a case in which both of the first heat source unit 10A and the second heat source unit 10B of the refrigeration cycle apparatus 1 are configured such that heat radiation and heat absorption of the refrigeration cycle are switchable has been described; however, the refrigeration cycle apparatus 1 is not limited to having such a configuration. In the refrigeration cycle apparatus 1, for example, the first heat source unit 10A or the second heat source unit 10B may be an exclusive machine that functions as a heat source whose heat is radiated from the refrigerant, and the utilization units 50 may be exclusive machines each function as a device whose heat is absorbed by the refrigerant. In this case, when the refrigeration cycle apparatus 1 is an air conditioning apparatus, the exclusive machine is a machine exclusive for cooling. In the refrigeration cycle apparatus 1, for example, the first heat source unit 10A or the second heat source unit 10B may be an exclusive machine that functions as a heat source whose heat is absorbed by the refrigerant, and the utilization units 50 may be exclusive machines each function as a device whose heat is radiated from the refrigerant. In this case, when the refrigeration cycle apparatus 1 is an air conditioning apparatus, the exclusive machine is a machine exclusive for heating.

(3-2) Modification 1B

In the aforementioned embodiment, a case in which the first heat source unit 10A of the refrigeration cycle apparatus 1 is renewed has been described; however, the technology of the present disclosure is also applicable to a case in which the refrigeration cycle apparatus 1 is newly installed. When the refrigeration cycle apparatus 1 is to be newly installed, the steps S2, S4, and S5, in which the refrigerant is recovered, are omitted, and the steps S1, S3, and S6 are included in the refrigerant charging method. Accordingly, in the case of new installation, the recovered refrigerant is not available at a local site, and thus, a mixed refrigerant of an R410A refrigerant, an R452B refrigerant, or the like that has been transported from a location other than the local site is newly charged.

(3-3) Modification 1C

In the aforementioned embodiment, a case in which the mixed refrigerant recovered from the already installed refrigeration cycle apparatus 1 includes the R410A refrigerant and in which the single refrigerant is the R32 refrigerant has been described; however, the combination of the mixed refrigerant and the single refrigerant usable in the refrigeration cycle apparatus 1 is not limited thereto. For example, the mixed refrigerant recovered from the already installed refrigeration cycle apparatus 1 may be an R452B, and the single refrigerant may be an R32 refrigerant or an R1234yf refrigerant.

When the recovered refrigerant including the R410A refrigerant is lacking with respect to the gross refrigerant amount of the refrigeration cycle apparatus 1 after renewal, the refrigerant that is further added, in addition to the single refrigerant previously charged in the second heat source unit 10B, is not limited to the R32 refrigerant and may be, for example, an R410A refrigerant, an R125 refrigerant, or an R1234yf refrigerant.

(3-4) Modification 1D

In the aforementioned embodiment, the refrigeration cycle apparatus 1 of a multi type in which the refrigeration cycle apparatus 1 includes the plurality of utilization units 50 has been described. A refrigeration cycle apparatus to which the technology of the present disclosure is applicable is, however, not limited to a multi-type refrigeration cycle apparatus. The technology of the present disclosure is also applicable to, for example, a refrigeration cycle apparatus of a pair type in which one utilization unit is connected to one heat source unit.

The number of heat source units connected to the refrigeration cycle apparatus is not limited to one, and a plurality of heat source units may be connected thereto. For example, when the refrigeration cycle apparatus includes two first heat source units, the recovered refrigerant may be transferred to two second heat source units that are intended to replace two first heat source units, and the weight of the two second heat source units after the transfer may be measured by the measurement system 60 to thereby detect the weight of the recovered refrigerant.

(3-5) Modification 1E

In the aforementioned embodiment, a case in which the compressor 11 of the first heat source unit 10A is used as a power source of the transfer of the refrigerant has been described. The power source of the transfer of the refrigerant is, however, not limited to the compressor 11 of the first heat source unit 10A. For example, a refrigerant recovering device that includes a compressor therein may be used for the transfer of the refrigerant.

(3-6) Modification 1F

Figure 6:
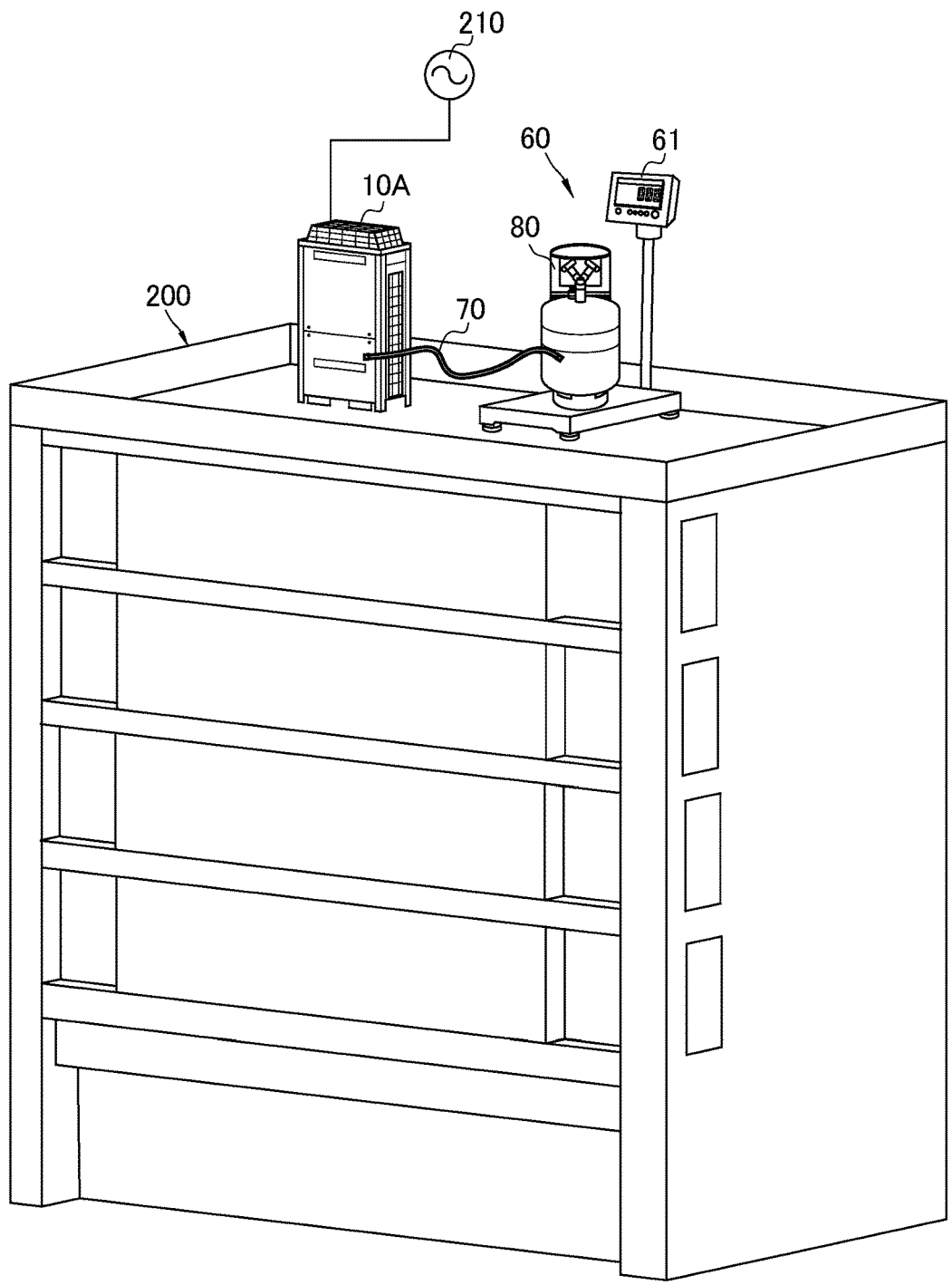
FIG. 6 is a schematic diagram for describing measurement of the weight of a refrigerant in a modification 1F.

In the aforementioned embodiment, a case in which the refrigerant is directly transferred from the first heat source unit 10A to the second heat source unit 10B has been described; however, as illustrated in FIG. 6, the refrigerant may be once transferred from the first heat source unit 10A to a recovery cylinder 80, and then, the refrigerant may be transferred from the recovery cylinder 80 to the second heat source unit 10B. In this case, it may be configured such that the scale 61 measures the weight of the recovery cylinder 80 before the recovery of the recovered refrigerant into the recovery cylinder 80 and the weight of the recovery cylinder 80 after the recovery of the recovered refrigerant into the recovery cylinder 80 and measures the weight of the recovered refrigerant from a difference between the weights of the recovery cylinder 80 before and after the recovery.

When the recovery cylinder 80 is to be thus used, for example, if the first heat source unit 10A is connected to the power source 210 and operable, the refrigerant of the utilization-side circuit 120 is transferred to the heat-source-side circuit 110 of the first heat source unit 10A through pump down operation. The service port of the high-pressure-side shutoff valve 21 of the first heat source unit 10A and the recovery cylinder 80 are connected to each other by the charge hose 70. As a result of the charge hose 70 being attached to the service port of the high-pressure-side shutoff valve 21 and the recovery cylinder 80, the heat-source-side circuit 110 of the first heat source unit 10A and the recovery cylinder 80 are in communication with each other. Then, the first heat source unit 10A is operated to drive the compressor 11, and the refrigerant is transferred through the service port of the high-pressure-side shutoff valve 21 of the first heat source unit 10A to the recovery cylinder 80. By closing the recovery cylinder 80 and detaching the charge hose 70 from the service port of the high-pressure-side shutoff valve 21 and the recovery cylinder 80, the service port of the high-pressure-side shutoff valve 21 is closed.

Figure 7:
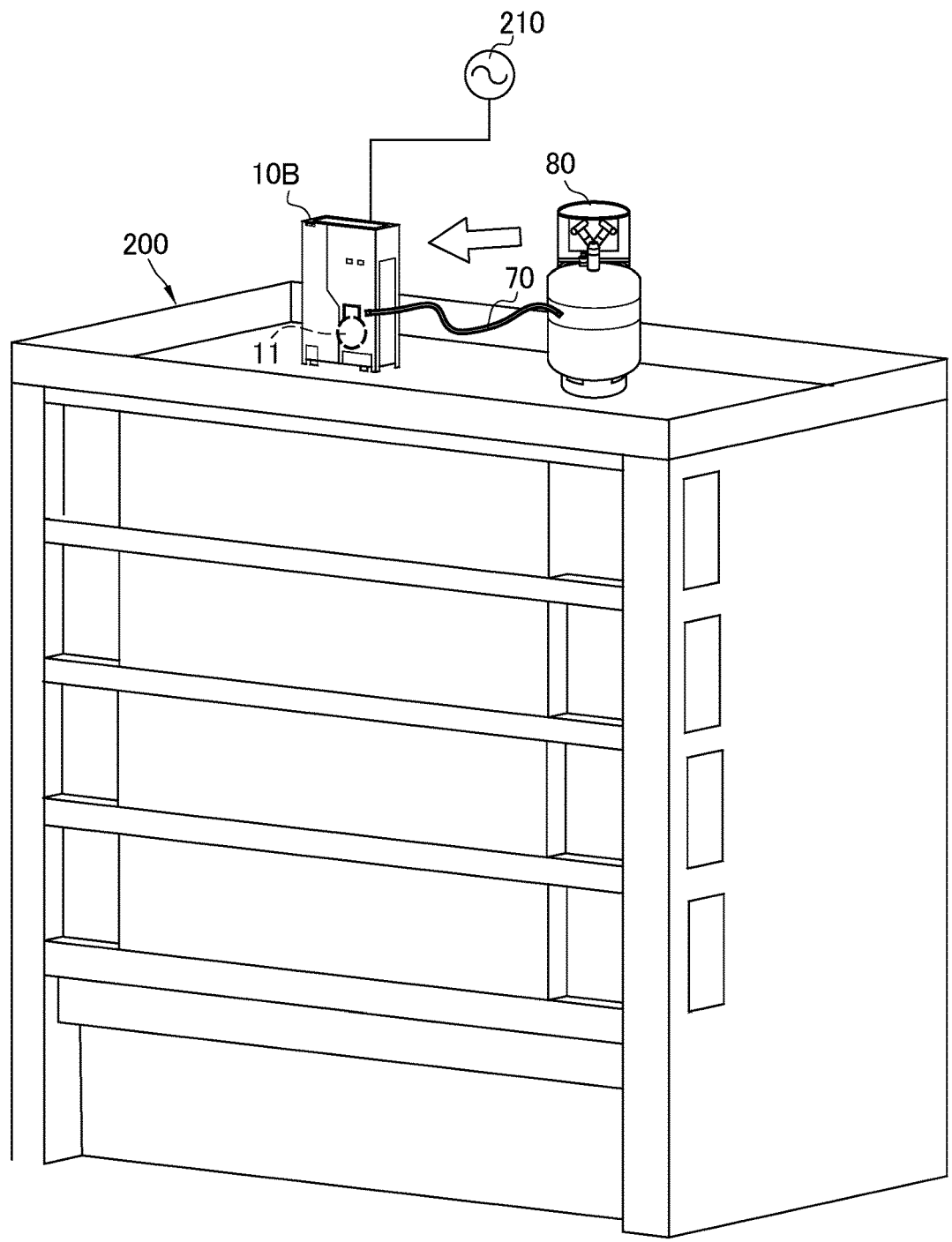
FIG. 7 is a schematic diagram for describing measurement of the weight of a refrigerant in the modification 1F.

With respect to the refrigeration cycle apparatus 1 after the second heat source unit 10B is incorporated therein, for example, airtightness of the refrigeration cycle apparatus 1 is inspected, and, after the airtightness of the refrigeration cycle apparatus 1 is confirmed, the refrigeration cycle apparatus 1 is evacuated by a vacuum pump. When the recovered refrigerant is to be transferred from the recovery cylinder 80 to the second heat source unit 10B incorporated in the refrigeration cycle apparatus 1, the recovery cylinder 80 and the charge port 23 of the second heat source unit 10B are connected to each other, as illustrated in FIG. 7, by the charge hose 70. As a result of the charge hose 70 being attached to the charge port 23 and the recovery cylinder 80, the heat-source-side circuit 110 of the second heat source unit 10B and the recovery cylinder 80 are in communication with each other. Then, the second heat source unit 10B is operated to drive the compressor 11, and the refrigerant is transferred from the recovery cylinder 80 to the charge port 23 of the second heat source unit 10B. By closing the recovery cylinder 80 and detaching the charge hose 70 from the charge port 23 and the recovery cylinder 80, the charge port 23 is closed.

It may be configured such that the scale 61 measures the weight of the recovery cylinder 80 after the recovery of the recovered refrigerant into the recovery cylinder 80 and the weight of the recovery cylinder 80 after the transfer of the recovered refrigerant from the recovery cylinder 80 to the second heat source unit 10B and measures the weight of the recovered refrigerant from a difference between the weights of the recovery cylinder 80 before and after the transfer.

When the recovery cylinder 80 is used, it is sufficient if the total of the weight of the single refrigerant previously charged in the second heat source unit 10B and the weight of the mixed refrigerant including the recovered refrigerant and the added refrigerant is within a range of a proper gross weight of the refrigerants for the refrigeration cycle apparatus 1 after renewal.

(3-7) Modification 1G

Figure 8:
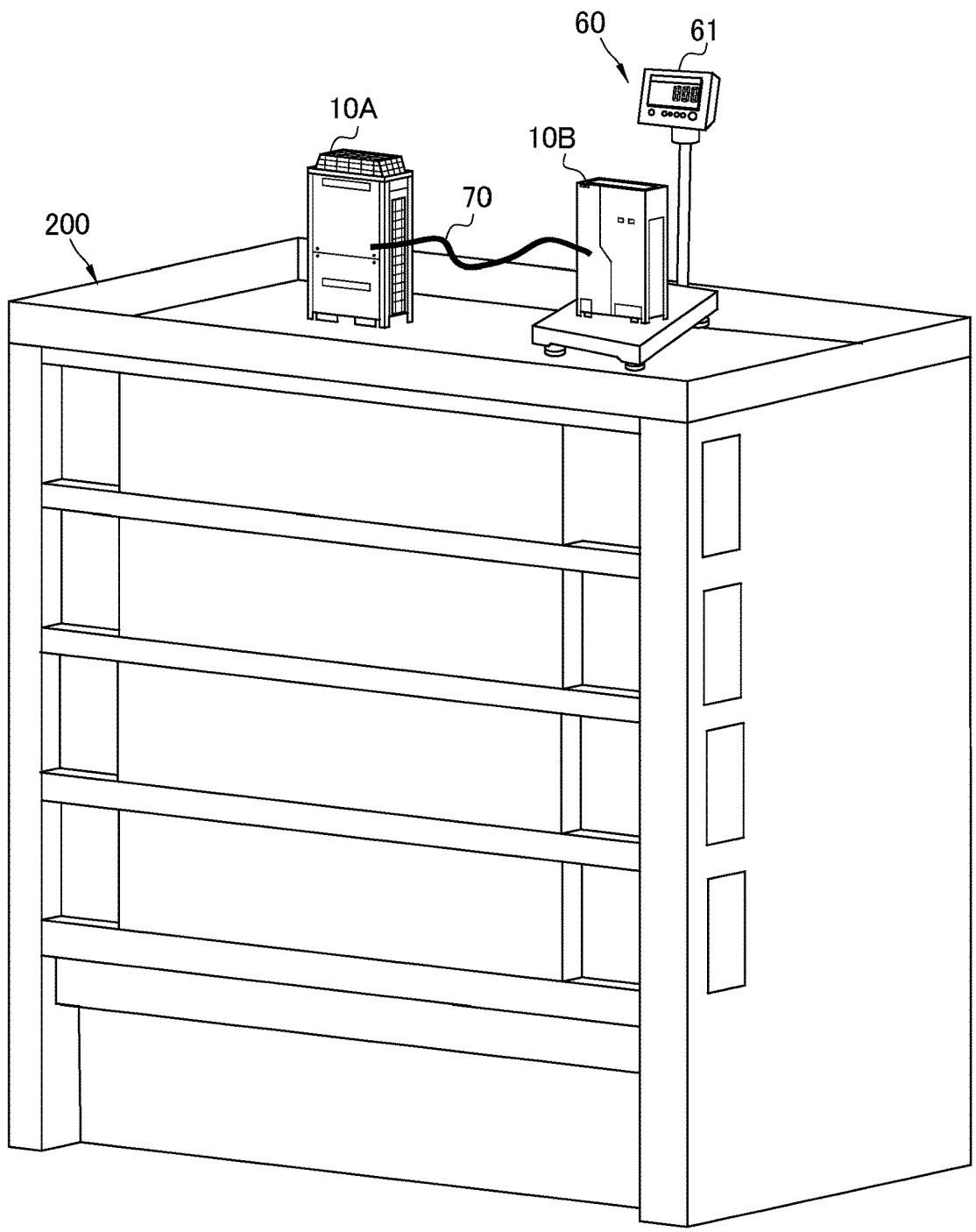
FIG. 8 is a schematic diagram for describing measurement of the weight of a refrigerant in a modification 1G.

In the aforementioned embodiment, a case in which the weight of the first heat source unit 10A that is before and after the transfer of the refrigerant to the second heat source unit 10B are measured has been described; however, as illustrated in FIG. 8, the weight of the second heat source unit 10B that is before and after the transfer of the refrigerant to the second heat source unit 10B may be measured. The weight of the second heat source unit 10B is measured by the scale 61. The scale 61 measures the recovered refrigerant transferred to the second heat source unit 10B by measuring the weight of the second heat source unit 10B before the recovered refrigerant is transferred to the second heat source unit 10B and after the recovered refrigerant is transferred to the second heat source unit 10B. It is possible to calculate the weight of the recovered refrigerant by subtracting a measured value obtained by the scale 61 regarding the second heat source unit 10B that is before the transfer of the recovered refrigerant to the second heat source unit 10B from a measured value obtained by the scale 61 regarding the second heat source unit 10B that is after the transfer of the recovered refrigerant to the second heat source unit 10B.

In the transfer of the refrigerant from the first heat source unit 10A to the second heat source unit 10B, for example, when the first heat source unit 10A is connected to the power source 210 and operable, the refrigerant of the utilization-side circuit 120 is transferred to the heat-source-side circuit 110 of the first heat source unit 10A through pump down operation. For example, the high-pressure-side shutoff valve 21 is closed, and the first heat source unit 10A is operated to perform cooling. The high-pressure-side shutoff valve 21 is closed, and operation in which the heat-source-side heat exchanger 14 of the first heat source unit 10A functions as a condenser is performed. When the pressure of the low-pressure-side shutoff valve 22 becomes sufficiently low, the low-pressure-side shutoff valve 22 is closed. The service port of the high-pressure-side shutoff valve 21 of the first heat source unit 10A and the charge port 23 of the second heat source unit 10B are connected to each other by the charge hose 70. As a result of the charge hose 70 being attached to the charge port 23 and the service port of the high-pressure-side shutoff valve 21, the heat-source-side circuit 110 of the first heat source unit 10A and the heat-source-side circuit 110 of the second heat source unit 10B are in communication with each other. Then, the first heat source unit 10A is operated to drive the compressor 11, and the refrigerant is transferred through the service port of the high-pressure-side shutoff valve 21 of the first heat source unit 10A to the charge port 23 of the second heat source unit 10B. By detaching the charge hose 70 from the charge port 23 and the service port of the high-pressure-side shutoff valve 21, the charge port 23 and the service port of the high-pressure-side shutoff valve 21 are closed. Since the recovered refrigerant has been transferred in the second heat source unit 10B, the recovered refrigerant in the second heat source unit 10B is charged to the refrigeration cycle apparatus 1 as a result of the second heat source unit 10B being incorporated in the refrigeration cycle apparatus 1.

(3-8) Modification 1H

Figure 9:
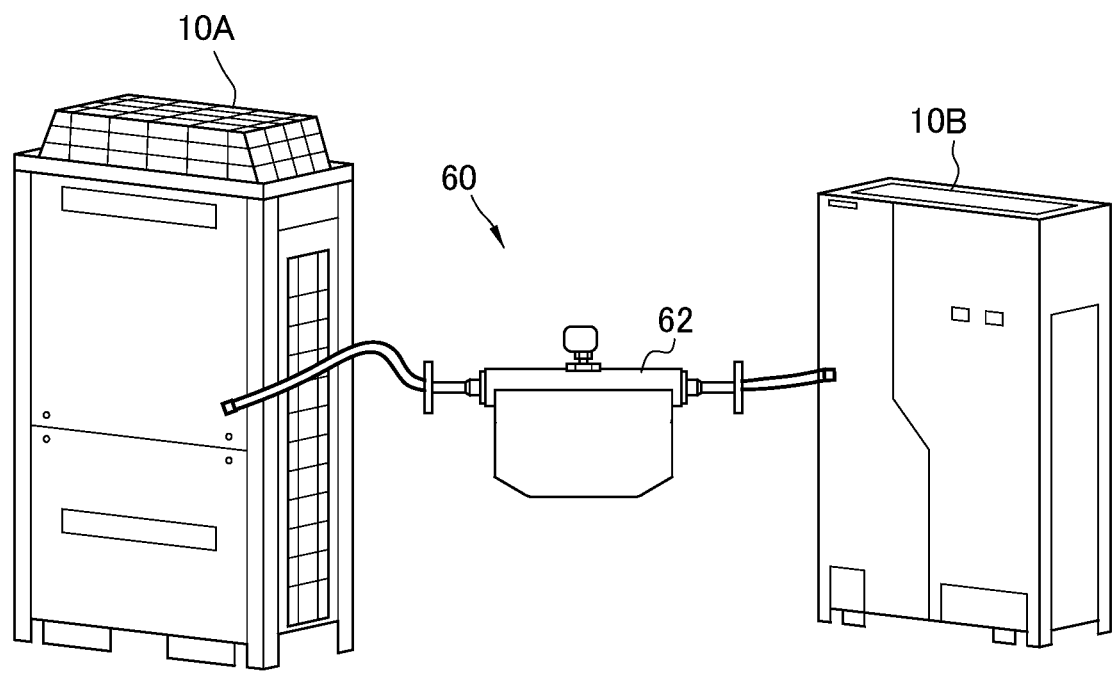
FIG. 9 is a schematic diagram for describing measurement of the weight of a refrigerant in modification 1H.

In the embodiment and the modifications mentioned above, a case in which the scale 61 is used to measure the weight of the recovered refrigerant has been described; however, as illustrated in FIG. 9, a mass flow meter 62 may be used to measure the weight of the recovered refrigerant that is transferred from the first heat source unit 10A to the second heat source unit 10B. In this case, the mass flow meter 62 is included in the measurement system 60. The mass flow meter 62 is, for example, a Coriolis flow meter. Using the Coriolis flow meter makes it possible to measure the mass of the recovered refrigerant even when the refrigerant is transferred from the first heat source unit 10A to the second heat source unit 10B in a gas-liquid two-phase state. Considering that a difference of gravitational acceleration on the earth is minute, it is treated in the present disclosure such that a measured value (kg) obtained by the mass flow meter 62 is nearly equal to the weight (kgf) of the recovered refrigerant.

Measurement using the mass flow meter 62 can be performed in any of a case in which the refrigerant is transferred from the first heat source unit 10A to the second heat source unit 10B with the first heat source unit 10A connected to the power source 210, a case in which the refrigerant is transferred from the first heat source unit 10A to the second heat source unit 10B with the second heat source unit 10B connected to the power source 210, or a case in which the refrigerant is transferred from the first heat source unit 10A to the second heat source unit 10B via the recovery cylinder 80.

(3-9) Modification 1I

In the refrigerant charging method for the refrigeration cycle apparatus 1 described in the aforementioned embodiment, it is preferable to further include a step of, before recovering the refrigerant from the first heat source unit 10A, operating the already installed refrigeration cycle apparatus 1 and heating the refrigerant in the refrigerant circuit 100.

(3-10) Modification 1J

In the refrigerant charging method for the refrigeration cycle apparatus 1, when the mixed refrigerant and the single refrigerant are mixed together during charging to the refrigeration cycle apparatus 1 after renewal and become a circulating refrigerant, the circulating refrigerant is preferably regulated to be non-flammable.

For example, when the mixed refrigerant is an R410A refrigerant and the single refrigerant is an R32 refrigerant, while pentafluoroethane is non-flammable, the R32 refrigerant (difluoromethane) has flammability, even though slightly; therefore, when the ratio of difluoromethane occupying the circulating refrigerant after charging increases, the circulating refrigerant has a possibility of having slight flammability. Thus, the mixture ratio of difluoromethane and pentafluoroethane at which the circulating refrigerant becomes non-flammable is previously examined, and the upper limit threshold of the mixture ratio of difluoromethane at which it can be judged to be non-flammable is determined in advance. Consequently, when an air conditioner after renewal is an apparatus intended for a non-flammable refrigerant, the circulating refrigerant is usable as it is. The circulating refrigerant is judged, from the measured weight of the recovered refrigerant and the weight of an R32 refrigerant to be replenished, to be non-flammable when the mixture ratio of difluoromethane occupying the circulating refrigerant is smaller than the upper limit threshold. When the circulating refrigerant can be judged to be non-flammable, only the R32 refrigerant is replenished. If it is not possible to judge that the circulating refrigerant is non-flammable, charging is performed such that the circulating refrigerant becomes non-flammable by, for example, adding another refrigerant, such as pentafluoroethane.

(3-11) Modification 1K

In the aforementioned embodiment, a case in which each of the first heat source unit 10A and the second heat source unit 10B is provided with the subcooling heat exchanger 15 has been described; however, the first heat source unit 10A and/or the second heat source unit 10B may not be provided with the subcooling heat exchanger 15.

In addition, a case in which each of the first heat source unit 10A and the second heat source unit 10B is provided with the oil regulator 19 has been described; however, the first heat source unit 10A and/or the second heat source unit 10B may not be provided with the oil regulator 19.

In addition, a case in which each of the first heat source unit 10A and the second heat source unit 10B is provided with the refrigerant regulator 18 has been described; however, the first heat source unit 10A and/or the second heat source unit 10B may not be provided with the refrigerant regulator 18.

In addition, a case in which each of the first heat source unit 10A and the second heat source unit 10B is provided with the oil separator 12 has been described; however, the first heat source unit 10A and/or the second heat source unit 10B may not be provided with the oil separator 12.

(4) Features (4-1)

In refrigerant charging with respect to the refrigeration cycle apparatus 1 of the aforementioned embodiment, an R32 refrigerant (an example of the first refrigerant), which is a single refrigerant, is charged in the second heat source unit 10B before the second heat source unit 10B is connected to the utilization units 50 to configure the refrigerant circuit 100; therefore, outside air is obstructed by the R32 refrigerant from entering the second heat source unit 10B. As a result, a foreign material and moisture can be suppressed from mixing with outside air and entering the second heat source unit 10B before incorporated in the refrigeration cycle apparatus 1. Such an effect can be obtained even when, for example, another single refrigerant, such as an R1234yf refrigerant is used as the single refrigerant, as an alternative to an R32 refrigerant.

In the above-described refrigeration cycle apparatus 1, an R32 refrigerant, which is a single refrigerant, is used as the first refrigerant. The first refrigerant, however, may be a mixed refrigerant. In addition, a 410A refrigerant, which is a mixed refrigerant, is used as the second refrigerant. The second refrigerant, however, may be a single refrigerant.

(4-2)

In the aforementioned embodiment, a single refrigerant, which is the first refrigerant, having the absolute pressure more than or equal to the atmospheric pressure is charged in the second heat source unit 10B, and therefore, outside air does not easily enter the second heat source unit 10B. Thus, it is possible to improve the effect of avoiding a foreign material, moisture, and the like from mixing with outside air and entering the second heat source unit 10B.

(4-3)

The absolute pressure of the R32 refrigerant (an example of the first refrigerant), which is a single refrigerant, charged in the second heat source unit 10B is less than 1 MPa, which is low, and therefore, compared with when a single refrigerant having a high pressure of 1 MPa or more is charged, it is possible to prevent entrance of outside air with a small amount of charging.

(4-4)

In the refrigerant charging method for the refrigeration cycle apparatus 1 of the aforementioned embodiment or in the second heat source unit 10B, due to the components of the R410A refrigerant including difluoromethane, it is possible to use the R32 refrigerant charged in the second heat source unit 10B as it is, without extracting the R32 refrigerant, for the refrigerant circuit 100 after renewal including the second heat source unit 10B compatible with a mixed refrigerant of pentafluoroethane, which is the other component of the R410A refrigerant, and difluoromethane, and therefore, the time and labor in refrigerant charging are saved.

(4-5)

As described in the aforementioned modification 1J, it is possible if the circulating refrigerant is non-flammable to use the circulating refrigerant as it is when the refrigeration cycle apparatus 1 after renewal is an apparatus intended for a non-flammable refrigerant, compared with when a flammable circulating refrigerant is used in the refrigerant circuit 100.

(4-6)

Figure 4:
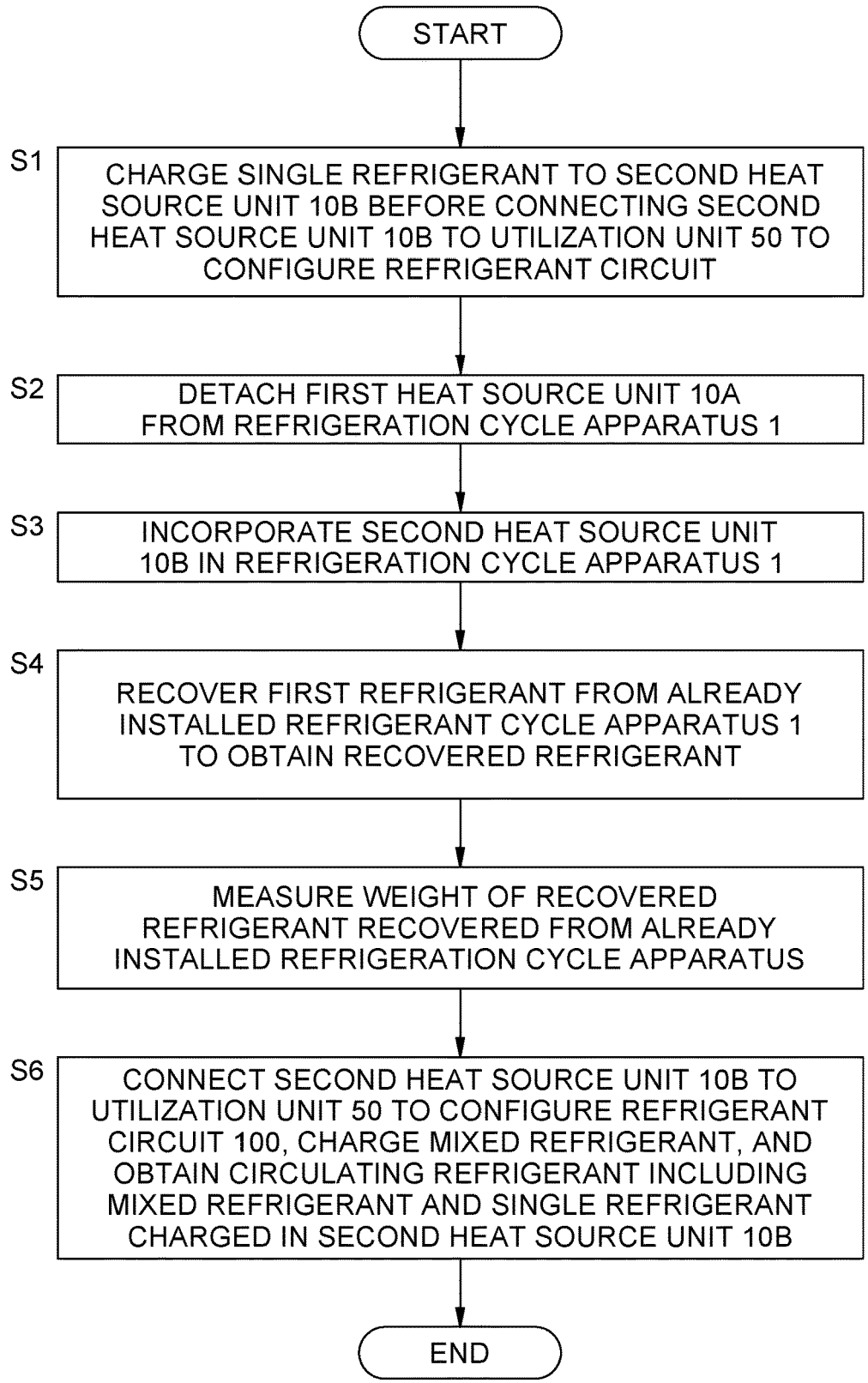
FIG. 4 is a flowchart illustrating an outline of a flow of a method of charging a refrigerant to a refrigeration cycle apparatus.

In the aforementioned embodiment, after the step S1 in FIG. 4, the second heat source unit 10B is transported to the rooftop of the building 200, which is the installation location, with the R32 refrigerant (an example of the first refrigerant), which is a single refrigerant, charged therein. Therefore, outside air is obstructed by the single refrigerant from entering the second heat source unit 10B during transport. As a result, it is possible to avoid a foreign material, moisture, and the like from mixing with outside air and entering the second heat source unit 10B during transport. Moreover, there is no need to extract the R32 refrigerant when connecting the second heat source unit 10B to the refrigerant circuit 100, and therefore, time and labor in charging work are saved.

(4-7)

In the aforementioned embodiment, before the step S5 in FIG. 4, the utilization units 50 and the connection pipes 81 and 82 configured the refrigerant circuit 100 that includes the first heat source unit 10A, the refrigerant circuit 100 being another refrigerant circuit that differs from the refrigerant circuit 100 including the second heat source unit 10B at the rooftop. The rooftop is a location where the second heat source unit 10B is to be connected to configure the refrigerant circuit 100. The utilization units 50 and the connection pipes 81 and 82 are connected to the second heat source unit 10B, which is another heat source unit other than the first heat source unit 10A. The second heat source unit 10B is included the refrigerant circuit 100 which is the other refrigerant circuit included the first heat source unit 10A. In the step S5, the recovered refrigerant recovered from the refrigerant circuit 100 including the first heat source unit 10A is charged as a mixed refrigerant (an example of the second refrigerant) to the refrigerant circuit 100 including the second heat source unit 10B.

In the refrigerant charging method configured as described above, the recovered refrigerant is charged as a mixed refrigerant in the step S5 to the refrigerant circuit 100 including the second heat source unit 10B, and it is thus possible to reutilize the recovered refrigerant in the refrigerant circuit 100 and to effectively utilize the recovered refrigerant.

In the aforementioned embodiment, a case in which the utilization units 50 that have been used for the first heat source unit 10A are also used for the second heat source unit 10B has been described; however, even when the connection pipes 81 and 82 are left behind and all of the utilization units 50 are replaced, the same effect is exerted.

(4-8)

The second heat source unit 10B of the aforementioned embodiment is for configuring the refrigerant circuit 100 of the refrigeration cycle apparatus 1 after renewal in which a refrigeration cycle is to be performed by a circulating refrigerant. The heat-source-side circuit 110 of the second heat source unit 10B is a circuit for configuring a portion of the refrigerant circuit 100 after renewal, and the second heat source unit 10B includes an R32 refrigerant (an example of the first refrigerant), which is a single refrigerant, charged in the heat-source-side circuit 110 that is before configuring a portion of the refrigerant circuit 100 after renewal. It is configured such that, in a state in which the heat-source-side circuit 110 of the second heat source unit 10B serves as a portion of the refrigerant circuit 100 after renewal and in which a mixed refrigerant is charged to this refrigerant circuit 100, an R32 refrigerant, which is a single refrigerant, and an R410 refrigerant (an example of the second refrigerant) included in a mixed refrigerant, the R32 refrigerant and the R410 refrigerant being mixed with each other, circulate as a circulating refrigerant in the refrigerant circuit 100.

Due to the R32 refrigerant being thus charged to the second heat source unit 10B before the utilization units 50 and the second heat source unit 10B are connected to each other, outside air can be obstructed by the R32 refrigerant from entering the second heat source unit 10B. As a result, the second heat source unit 10B can avoid a foreign material, moisture, and the like from mixing with outside air and entering the refrigerant circuit 100 in the inner portion thereof.

(4-9)

In the aforementioned embodiment, the first heat source unit 10A of an already installed refrigeration cycle apparatus in which a refrigeration cycle is to be performed by a circulating refrigerant is replaced with the second heat source unit 10B, and the renewed refrigeration cycle apparatus 1 is thereby obtained. When the first heat source unit 10A is to be replaced with the second heat source unit 10B, the connection pipes 81 and 82, which are the connection pipes connected to the first heat source unit 10A, are connected to the second heat source unit 10B to thereby configure the refrigerant circuit 100 in which the circulation refrigerant that performs the refrigeration cycle flows. As above, the connection pipes 81 and 82 of the already installed refrigeration cycle apparatus are used in the refrigerant circuit 100, and it is thus possible to reduce costs for obtaining the renewed refrigeration cycle apparatus 1, compared with when new connection pipes are used.

An embodiment of the present disclosure has been described above; however, it should be understood that various changes in the forms and the details are possible without deviating from the gist and the scope of the present disclosure described in the claims.

REFERENCE SIGNS LIST 1 refrigeration cycle apparatus
10A first heat source unit
10B second heat source unit
50 utilization unit
81, 82 connection pipe
100 refrigerant circuit
110 heat-source-side circuit
120 utilization-side circuit
120 Citation List

PATENT LITERATURE

PTL 1: Japanese Laid-Open Patent Application No. 2009-222356

The invention claimed is:

1. A refrigerant charging method of charging a refrigerant to a refrigerant circuit in which a refrigeration cycle is to be performed by a circulating refrigerant, the refrigerant circuit being configured by connecting a heat source unit and a utilization unit to each other, the method comprising:
  (a) charging a first refrigerant to the heat source unit before connecting the heat source unit to the utilization unit to configure the refrigerant circuit; and
  (b) connecting the heat source unit to the utilization unit and additionally charging a second refrigerant that differs from the first refrigerant to the refrigerant circuit to obtain the circulating refrigerant that includes the second refrigerant and the first refrigerant that is charged in the heat source unit, wherein
  the second refrigerant is a refrigerant recovered from another refrigerant circuit that previously connected another heat source unit that is different from the heat source unit to the utilization unit.

2. The refrigerant charging method according to claim 1, wherein, in (a), the first refrigerant charged in the heat source unit has an absolute pressure that is more than or equal to an atmospheric pressure at 20° C. in the heat source unit.

3. The refrigerant charging method according to claim 2, wherein, in (a), the first refrigerant charged in the heat source unit has an absolute pressure that is less than 1 MPa at 35° C. in the heat source unit.

4. The refrigerant charging method according to claim 1, wherein the first refrigerant is an R32 refrigerant, and the second refrigerant includes an R410A refrigerant.

5. The refrigerant charging method according to claim 1, wherein the circulating refrigerant is non-flammable.

6. The refrigerant charging method according to claim 1, further comprising:

after (a), transporting the heat source unit with the first refrigerant charged therein to a location where the heat source unit is to be connected to configure the refrigerant circuit.

7. A refrigerant charging method of charging a refrigerant to a refrigerant circuit in which a refrigeration cycle is to be performed by a circulating refrigerant, the refrigerant circuit being configured by connecting a heat source unit and a utilization unit to each other, the method comprising:
   (a) charging a first refrigerant to the heat source unit before connecting the heat source unit to the utilization unit to configure the refrigerant circuit; and
   (b) connecting the heat source unit to the utilization unit and additionally charging a second refrigerant that differs from the first refrigerant to the refrigerant circuit to obtain the circulating refrigerant that includes the second refrigerant and the first refrigerant that is charged in the heat source unit,
   wherein, after (a), the method comprises transporting the heat source unit with the first refrigerant charged therein to a location where the heat source unit is to be connected to configure the refrigerant circuit,
   wherein, before (b) is performed, a connection pipe connected to the utilization unit and/or the heat source unit is connected to another heat source unit other than the heat source unit at the location and configures another refrigerant circuit that differs from the refrigerant circuit, and
   wherein, in (b), a recovered refrigerant recovered from the other refrigerant circuit is charged as the second refrigerant to the refrigerant circuit.

8. The refrigerant charging method according to claim 2, wherein the first refrigerant is an R32 refrigerant, and the second refrigerant includes an R410A refrigerant.

9. The refrigerant charging method according to claim 3, wherein the first refrigerant is an R32 refrigerant, and the second refrigerant includes an R410A refrigerant.

10. The refrigerant charging method according to claim 2, wherein the circulating refrigerant is non-flammable.

11. The refrigerant charging method according to claim 3, wherein the circulating refrigerant is non-flammable.

12. The refrigerant charging method according to claim 4, wherein the circulating refrigerant is non-flammable.

13. The refrigerant charging method according to claim 2, further comprising:
   after (a), transporting the heat source unit with the first refrigerant charged therein to a location where the heat source unit is to be connected to configure the refrigerant circuit.

14. The refrigerant charging method according to claim 3, further comprising:
   after (a), transporting the heat source unit with the first refrigerant charged therein to a location where the heat source unit is to be connected to configure the refrigerant circuit.

15. The refrigerant charging method according to claim 4, further comprising:
   after (a), transporting the heat source unit with the first refrigerant charged therein to a location where the heat source unit is to be connected to configure the refrigerant circuit.

16. The refrigerant charging method according to claim 5, further comprising:
   after (a), transporting the heat source unit with the first refrigerant charged therein to a location where the heat source unit is to be connected to configure the refrigerant circuit.

* * * * *